(12) United States Patent
Myung

(10) Patent No.: US 11,990,811 B2
(45) Date of Patent: May 21, 2024

(54) COIL ARRANGEMENT FOR ELECTROMAGNETIC MACHINE AND MOVING FIELD ELECTROMAGNETIC MACHINE USING SAME

(71) Applicant: Nam Soo Myung, Seongnam-si (KR)

(72) Inventor: Nam Soo Myung, Seongnam-si (KR)

( * ) Notice: Subject to any disclaimer, the term of this patent is extended or adjusted under 35 U.S.C. 154(b) by 315 days.

(21) Appl. No.: 17/310,299

(22) PCT Filed: Jan. 30, 2020

(86) PCT No.: PCT/KR2020/001424
§ 371 (c)(1),
(2) Date: Jul. 27, 2021

(87) PCT Pub. No.: WO2020/159253
PCT Pub. Date: Aug. 6, 2020

(65) Prior Publication Data
US 2022/0140682 A1 May 5, 2022

(30) Foreign Application Priority Data

Jan. 30, 2019 (KR) ........................ 10-2019-0012247

(51) Int. Cl.
*H02K 3/28* (2006.01)
(52) U.S. Cl.
CPC ...................................... *H02K 3/28* (2013.01)
(58) Field of Classification Search
CPC ...................................................... H02K 3/28
(Continued)

(56) References Cited

U.S. PATENT DOCUMENTS

| 6,373,161 B1 | 4/2002 | Khalaf |
| 9,302,577 B2 * | 4/2016 | Catalan ............... H02K 41/031 |

(Continued)

FOREIGN PATENT DOCUMENTS

| AU | 2015408849 A1 | 5/2017 |
| CN | 102857001 A | 1/2013 |

(Continued)

OTHER PUBLICATIONS

European Patent Office, European search report for Application No. 20748799.2-1202 / 3920381 PCT/KR2020001424, dated Oct. 10, 2022, 7 pages.

*Primary Examiner* — Tran N Nguyen
*Assistant Examiner* — Masoud Vaziri
(74) *Attorney, Agent, or Firm* — Stetina Brunda Garred & Brucker

(57) ABSTRACT

The present invention relates to a coil arrangement and a moving field electromagnetic machine using same, the coil arrangement being characterized by comprising a first coil arrangement and a second coil arrangement that are formed spaced a predetermined distance apart from each other and have a mirror image in the spaced apart direction, wherein: the first coil arrangement includes at least one first half cycle and at least one second half cycle that are formed adjacent to each other; the first half cycle includes at least two coils having currents flowing in different directions; and the first half cycle and the second half cycle have a mirror image in the direction in which the first and second half cycles are adjacent, thereby maximizing efficiency and increasing power by minimizing the magnetic flux leakage and the core loss.

20 Claims, 7 Drawing Sheets

(58) Field of Classification Search
USPC .................................................. 310/208, 210
See application file for complete search history.

(56) References Cited

U.S. PATENT DOCUMENTS

| | | | | |
|---|---|---|---|---|
| 10,651,717 | B2* | 5/2020 | Zhang | .................. H02K 41/031 |
| 2008/0211322 | A1 | 9/2008 | Heinrich et al. | |
| 2008/0224557 | A1* | 9/2008 | Cleveland | .................. B62J 6/20 |
| | | | | 310/156.43 |
| 2012/0091832 | A1* | 4/2012 | Soderberg | ............... C22C 33/02 |
| | | | | 310/156.01 |
| 2012/0119861 | A1* | 5/2012 | Tang | .................... H01F 7/0278 |
| | | | | 335/306 |
| 2013/0062983 | A1* | 3/2013 | Sankar | .................... H01F 7/021 |
| | | | | 310/152 |
| 2015/0348690 | A1* | 12/2015 | Fullerton | .............. H01F 7/0221 |
| | | | | 335/295 |
| 2017/0117763 | A1* | 4/2017 | Woolmer | .............. H02K 5/161 |

FOREIGN PATENT DOCUMENTS

| | | | |
|---|---|---|---|
| CN | 104578506 | A | 4/2015 |
| JP | 11-164536 | A | 6/1999 |
| JP | 2003-153514 | A | 5/2003 |
| JP | 2008512072 | A | 4/2008 |
| JP | 2012222983 | A | 11/2012 |
| KR | 10-1854723 | B1 | 5/2018 |
| WO | 2017014062 | A1 | 1/2017 |

* cited by examiner

COIL ARRANGEMENT FOR ELECTROMAGNETIC MACHINE AND MOVING FIELD ELECTROMAGNETIC MACHINE USING SAME

CROSS-REFERENCE TO RELATED APPLICATIONS

This application claims priority to PCT International Application No. PCT/KR2020/001424 filed on Jan. 30, 2020, which application claims priority to Korean Patent Application No. 10-2019-0012247 filed on Jan. 30, 2019, the entire disclosures of which are expressly incorporated herein by reference.

STATEMENT RE: FEDERALLY SPONSORED RESEARCH/DEVELOPMENT

Not Applicable

BACKGROUND

Technical Field

The present invention relates to a coil arrangement for an electromagnetic machine and a moving field electromagnetic machine using the same, and in particular, relates to a coil arrangement and moving field electromagnetic machine capable of maximizing the efficiency and increasing the power of an electromagnetic machine by utilizing the reinforced magnetic force or minimizing the size and weight of the machine.

Background Art

In various industrial fields, there is a great demand for installing a reversible electromagnetic machine comprising a rotating member in a system. According to the operating conditions of the system in which the machine is installed, it is a generator that converts the mechanical energy by the rotational motion of the rotating member and generates the electrical energy with this mechanical energy. Power generated from these generators can be fed or stored to other system components. In addition, it is a motor that supplies electrical energy to the machine and converts it into mechanical energy to rotate a rotating member to obtain rotational power.

Such an electromagnetic machine comprises a stator and a rotor. In general, it operates on the principle that a rotating torque is generated in a rotor by a rotating magnetic field generated when a current flows in a coil of a stator. The rotational force of the rotor is used as rotational power by the rotational torque.

In general, in a motor using an iron core, a stator is manufactured by winding coils on an iron core formed at regular intervals along an inner circumference, but there is a concern or an issue in that the efficiency of the motor is reduced due to the loss in the iron core. In addition, in the case of a motor using a core, the magnetic flux in the core can be saturated when the current through the winding is high, so performance may be limited or magnetic leakage increases and thus the performance reaches the limit.

Technical Subject

The present invention is to solve such problems of the prior art, and an object of the present invention is to have a structure in which the magnetic flux is strengthened in one direction and the magnetic flux is canceled in the other direction by the coil arrangement, thereby providing a coil arrangement and a moving field electromagnetic machine capable of maximizing the efficiency of an electromagnetic machine by using the enhanced magnetic force, increasing the power, or minimizing the size and weight of the machine.

Technical Solution

As an embodiment for achieving the above object, a coil arrangement according to an embodiment of the present invention is comprising: a first coil arrangement and a second coil arrangement formed to be spaced apart at a predetermined interval and having a mirror image in a spaced apart direction, and wherein the first coil arrangement comprises at least one first half period and at least one second half period formed adjacent to each other, wherein the first half period comprises at least two coils having different current flowing directions, and wherein the first half period and the second half period have mirror image in adjacent directions.

In addition, a direction of a magnetic field formed between the two coils forming the first half period and a direction of a magnetic field formed between two coils forming the second half period are opposite to each other.

In addition, the first half period comprises: a first layer adjacent to the second coil arrangement and comprising a first layer coil structure comprising at least two coils having different current flowing directions; a second layer disposed on an upper portion of the first layer and comprising a second layer coil structure having a same current flowing direction as the first layer coil structure of the first layer but located more outwardly than the first layer coil structure; and a third layer disposed on an upper portion of the second layer and comprising a third layer coil structure having a current flowing direction opposite to the second layer coil structure but located more inwardly than the second layer coil structure.

In addition, the coil arrangement is further comprising: a fourth layer disposed on an upper portion of the third layer and comprising a fourth layer coil structure having a same current flowing direction as the third layer coil structure but located more outwardly than the third layer coil structure.

In addition, the first half period comprises: a lower layer adjacent to the second coil arrangement and comprising a lower layer coil structure comprising at least two coils having different current flowing direction from each other; and an upper layer disposed on an upper portion of the lower layer and comprising an upper layer coil structure having a current flowing direction opposite to the lower layer coil structure.

In addition, the first coil arrangement comprises: a plurality of first half periods; and a plurality of second half periods, wherein the first half periods and the second half periods are periodically formed in adjacent directions.

In addition, the first coil arrangement or the second coil arrangement has a length being extended according to the current flowing directions, and comprises a segmented toroid current distribution or a segmented solenoid current distribution.

In addition, the coil arrangement is formed of at least two sets, and currents flowing in the coils constituting the respective sets have the same phase or different phases.

In addition, a moving magnetic field is formed by having a phase difference between the currents flowing in the coils constituting the respective sets.

As an embodiment for achieving the above object, a moving field electromagnetic machine according to an embodiment of the present invention is comprising: a stator; and a mover, wherein the stator comprises a first coil arrangement, wherein the first coil arrangement comprises at least one first half period and at least one second half period formed adjacent to each other, wherein the first half period comprises at least two coils having different current flowing directions, and wherein the first half period and the second half period have mirror image in adjacent directions.

In addition, the stator further comprises: a second coil arrangement formed to be spaced apart from the first coil arrangement by a predetermined interval and having a mirror image in the spaced apart direction.

In addition, the mover is disposed between the first coil arrangement and the second coil arrangement.

In addition, the first coil arrangement and the second coil arrangement are formed of at least two sets, and currents flowing in the coils constituting the respective sets have different phases so as a moving magnetic field to be formed.

In addition, the mover comprises a second coil arrangement formed to be spaced apart from the first coil arrangement by a predetermined interval and having a mirror image in the spaced apart direction.

In addition, a direction of a magnetic field formed between the two coils forming the first half period and a direction of a magnetic field formed between two coils forming the second half period are opposite to each other.

In addition, the first half period comprises: a first layer adjacent to the second coil arrangement and comprising a first layer coil structure comprising at least two coils having different current flowing directions; a second layer disposed on an upper portion of the first layer and comprising a second layer coil structure having a same current flowing direction as the first layer coil structure of the first layer but located more outwardly than the first layer coil structure; and a third layer disposed on an upper portion of the second layer and comprising a third layer coil structure having a current flowing direction opposite to the second layer coil structure but located more inwardly than the second layer coil structure.

In addition, the first half period comprises: a lower layer adjacent to the second coil arrangement and comprising a lower layer coil structure comprising at least two coils having different current flowing direction from each other; and an upper layer disposed on an upper portion of the lower layer and comprising an upper layer coil structure having a current flowing direction opposite to the lower layer coil structure.

In addition, the first coil arrangement comprises: a plurality of first half periods; and a plurality of second half periods, wherein the first half periods and the second half periods are periodically formed in adjacent directions.

In addition, the first coil arrangement has a length being extended according to the current flowing directions, and comprises a segmented toroid current distribution or a segmented solenoid current distribution.

In addition, the mover is a rotor.

BRIEF SUMMARY

Accordingly, the following effects are expected through the above-described problem solving means.

The coil arrangement according to the present invention has a structure in which magnetic flux is strengthened in one direction and magnetic flux is canceled in the other direction, so that there is an effect in that the magnetic field leakage outside the region of interest can be almost eliminated.

In addition, the electromagnetic machine according to the present invention has the advantage of maximizing the efficiency of the machine and increasing the power by using the enhanced magnetic force.

The electromagnetic machine according to the present invention minimizes core loss by not using or using a minimum iron core, and can minimize its size and weight. The electromagnetic machine according to the present invention has the advantage of having a large margin in terms of performance limitations or restrictions by not using or using a minimum iron core.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
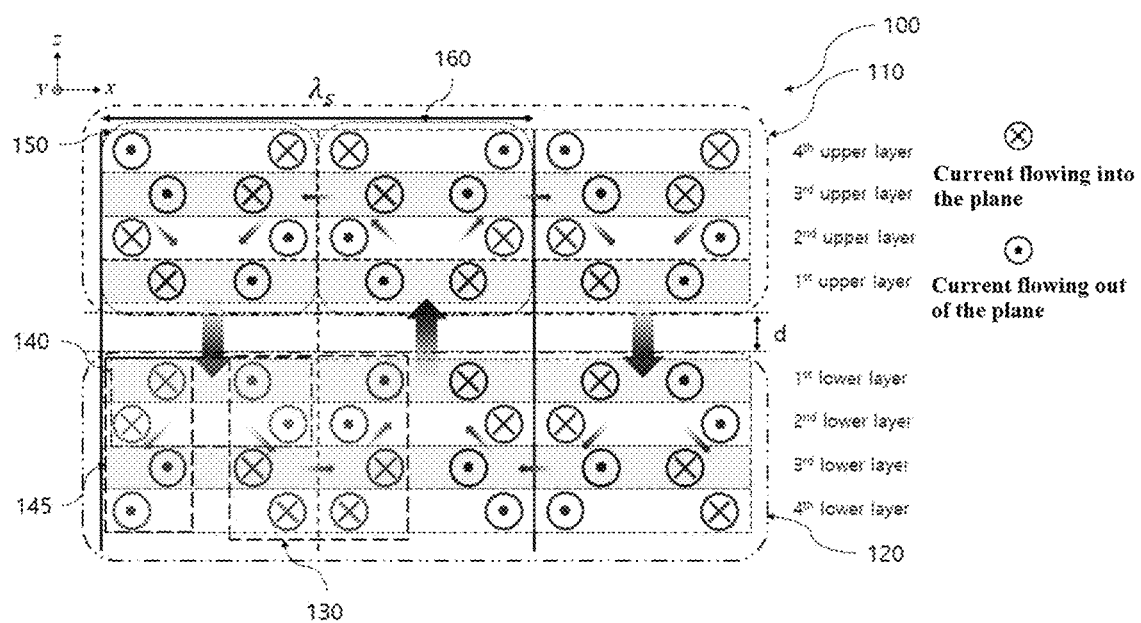
FIG. 1 is an exemplary cross-sectional view schematically illustrating current flow and magnetic flux magnitude according to a coil arrangement according to an embodiment of the present invention.

Hereinafter, preferred embodiments of the present invention will be described in detail with reference to the accompanying drawings. Advantages and features of the present invention, and a method of achieving them, will become apparent with reference to the embodiments described below in detail in conjunction with the accompanying drawings. However, the present invention is not limited to the embodiments described herein, and may be embodied in different forms. Rather, the embodiments introduced herein are provided so that this disclosure may be thorough and complete, and the spirit of the present invention may be sufficiently conveyed to those skilled in the art, and the present invention is only defined by the scope of the claims. Meanwhile, the same reference numerals refer to the same components throughout the specification.

The terminology used in this specification is for the purpose of describing the embodiments and is not intended to limit the present invention. In this specification, the singular also comprises the plural, unless specifically stated otherwise in the phrase. As used herein, 'comprises' and/or 'comprising' the recited components, steps, operations and/or elements, do not exclude the presence or addition of one or more other components, steps, operations and/or elements. In addition, since it is according to a preferred embodiment, reference signs provided in the order of description are not necessarily limited to the order. In addition, in this specification, when a certain constituent or component is mentioned or other constituents or components are not excluded, it means that other constituents or components may be additionally interposed if necessary.

The description and examples provided in this specification are presented for illustrative purposes and are not intended to limit the scope of the appended claims. This specification is to be considered as illustrative of the principles of the invention and is not intended to limit the spirit and scope of the claims and/or the scope of the described embodiments. Those skilled in the art will be able to modify the present invention for a particular application of the present invention.

In addition, the embodiments described in this specification will be described with reference to cross-sectional and/or plan views, which are ideal illustrative views of the present invention. In the drawings, thicknesses of films and regions are exaggerated for effective description of technical content. Accordingly, the shape of the illustrative drawing may be modified due to manufacturing technology and/or tolerance. Accordingly, embodiments of the present invention are not limited to the specific form shown, but also comprise changes in the form generated according to the manufacturing process. For example, the etched region shown at a right angle may be rounded or have a predetermined curvature. Accordingly, the regions illustrated in the drawings have general properties, and the shapes of the regions illustrated in the drawings are intended to illustrate specific shapes of regions of the device and not to limit the scope of the invention.

FIG. 1 is an exemplary cross-sectional view schematically illustrating current flow and magnetic flux magnitude according to a coil arrangement according to an embodiment of the present invention. As illustrated in FIG. 1, a coil arrangement 100 according to an embodiment of the present invention comprises a first coil arrangement 110 and a second coil arrangement 120.

The first coil arrangement 110 and the second coil arrangement 120 are formed to be spaced apart by a predetermined interval, and have a mirror image in the spaced apart direction. That is, the first coil arrangement 110 and the second coil arrangement 120 have mirror images with the x-axis as the axis of symmetry. In here, the mirror image has a structure corresponding to each other about the axis of symmetry, and means that it has the same structure as reflected in a mirror.

In this case, the first coil arrangement 110 comprises at least one first half period and at least one second half period formed adjacent to each other. The first half period 150 and the second half period 160 are formed as one period, and may be formed in a periodic form in which the same structure is repeated every spatial period $\lambda_S$. The first half period 150 comprises at least two coils having different current flowing directions, and the first half period and the second half period have mirror images in adjacent directions. That is, the first half period 150 has a mirror image of the second half period 160 with the z-axis as an axis of symmetry.

Referring to FIG. 1, a first coil arrangement 110 and a second coil arrangement 120 are spaced apart from each other by a predetermined interval in the z-axis direction, that is, an air gap d. The interval between the first coil arrangement 110 and the second coil arrangement 120 may be set by magnetic flux or other components to be implemented using the coil arrangement, and may be set by a user.

The first half period 150 comprises at least two coils in which current flows are different from each other. FIG. 1 illustrates an embodiment in which the first half period 150 is formed of a plurality of layers, but this is only one example, and the first half period 150 may comprise at least two pieces of coils in which current flows are different from each other. The two coils may have opposite current flow directions. In one coil, a current flows in +y direction, a direction flowing into the plane of FIG. 1, and in the other coil, a current may flow in −y direction, a direction flowing out of the plane of FIG. 1. When a current flows in a coil in one direction, a magnetic field is created in the coil. When a current flows into the plane of FIG. 1, a magnetic field is formed surrounding the coil in a clockwise direction, and when a current flows out of the plane of FIG. 1, a magnetic field is formed in a counterclockwise direction surrounding the coil. In here, the two coils comprised in the first half period 150 may be coils comprised in the first upper layer on the first half period 150 of FIG. 1. The magnetic field between the two coils is formed in the direction of the second coil arrangement 120 to strengthen the magnetic flux due to the counterclockwise magnetic field generated by the coil located on the right side and through which current flows out of the plane and the clockwise magnetic field generated by the coil located on the left side and through which current flows into the plane In the second half period 160 having a mirror image of the first half period 150, unlike the first half period, a coil through which current flows into the plane is formed on the right side, and a coil through which current flows out of the plane is formed on the left side. Since the coil of the second half period 160 is formed to have an opposite current flow direction than that of the coil of the first half period 150, the magnetic field between the two coils is formed in the opposite direction of the second coil arrangement 120 to strengthen the magnetic flux.

The first coil arrangement 110 and the second coil arrangement 120 may be formed in a plurality of layers. It may be formed of a plurality of layers of two or more layers. Although illustrated as four layers by way of example in FIG. 1, the present invention is not limited thereto, and the number of layers may be small or additional layers may be further comprised as needed.

The first coil arrangement 110 and the second coil arrangement 120 may be formed in three layers.

The first layer of the first half period 150 may comprise at least two coils through which current flows in different directions. For example, the left side coil of the first layer is a coil indicating a current flowing into the plane, and the right side coil is a coil indicating a current flowing out of the plane. The second layer of the first half period 150 has the same current direction as the coil current of the first layer, but is disposed relatively outer side than the coil of the first layer.

In addition, the third layer of the first half period 150 is opposite to the coil current direction of the second layer. That is, the left side coil of the third layer is a coil indicating the current flowing out of the plane, and the right side coil is the coil indicating the current flowing into the plane. Meanwhile, the coil of the third layer is disposed relatively inward than the coil of the second layer. The fourth layer of the first half period 150 has the same current direction as the coil current of the third layer, but is disposed relatively outer side than the coil of the third layer.

Alternatively, the first coil arrangement 110 and the second coil arrangement 120 may be formed as a lower layer and an upper layer. In here, the lower layer may correspond to the first layer of FIG. 1, and the upper layer may correspond to the third layer of FIG. 1. It may comprise only the first layer and the third layer, and may not comprise the second layer and the fourth layer.

Meanwhile, the current directions of the first half period 150 and the second half period 160 illustrated in FIG. 1 are exemplarily shown for explanation, and are not limited thereto, and relationship and the direction of the current in the coil can change with time. In addition, the relative positions of coils or the number of coils in each layer illustrated in FIG. 1 are illustratively shown for explanation, and the position or number of coils is not limited thereto and can be changed within the scope that does not violate the spirit of the present invention.

The first coil arrangement 110 may be formed in a coil structure having the above-described current distribution. Here, the first coil arrangement 110 and the second coil arrangement 120 are exemplarily illustrated as a stacked coil structure 130, a horizontally stacked coil structure 140 and a vertically stacked coil structure 145, but is not limited thereto, and if necessary, a planar structure having the current distribution illustrated in FIG. 1 may be substituted for the three-dimensional stacked structure.

The coil arrangement 100 according to an embodiment of the present invention has a structure in which magnetic flux is strengthened in one direction and magnetic flux is canceled in the other direction. That is, referring to FIG. 1, in the first coil arrangement 110 and the second coil arrangement 120, the magnetic flux is strengthened to one side facing each other in the z-axis direction, and the magnetic flux is relatively cancelled or appears to be almost negligible to exist in the other directions. Accordingly, the coil arrangement 100 according to the present invention has the effect of minimizing the magnetic field leakage outside the region of interest.

Figure 2:
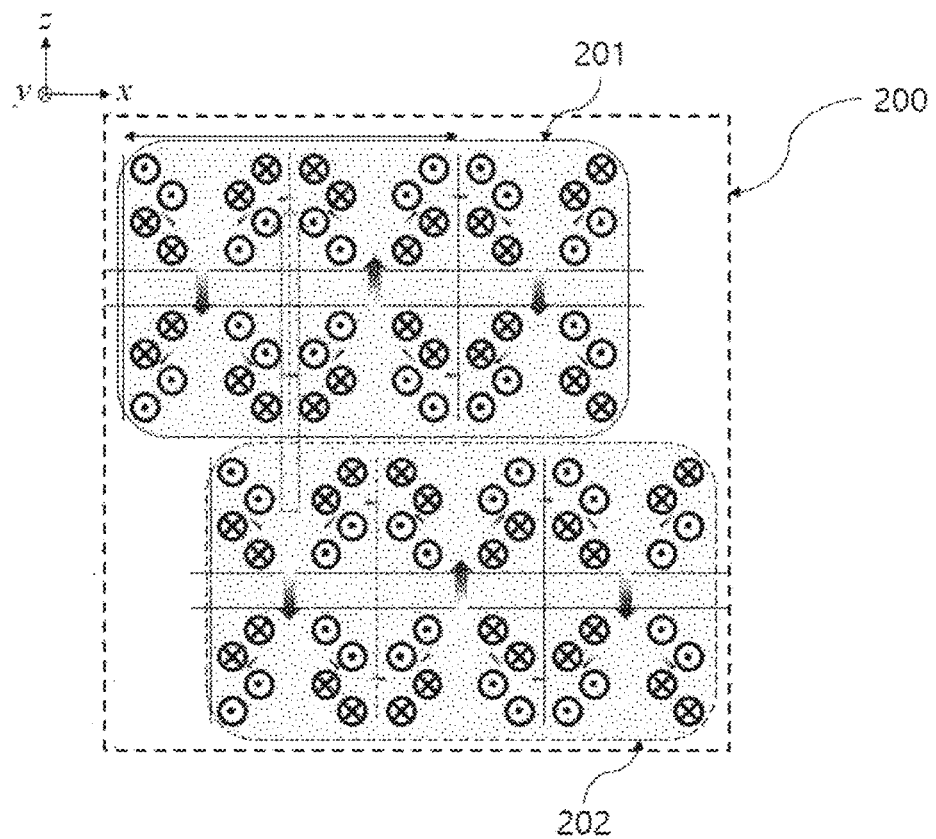
FIG. 2 is a schematic cross-sectional view illustrating a coil arrangement according to an embodiment of the present invention as two phase difference coil sets.

FIG. 2 is a schematic cross-sectional view illustrating a coil arrangement according to an embodiment of the present invention as two phase difference coil sets.

Referring to FIG. 2, a coil arrangement 200 according to an embodiment of the present invention comprises a coil arrangement set 201 for phase A and a coil arrangement set 202 for phase B having a phase difference of 90 degrees from each other. The two coil arrangement sets may have different phases or may have the same phase with each other. The coil arrangement 200 disposes a set of coil arrangements 202 for phase B between a set of coil arrangements 201 for phase A allowing the sets to be disposed alternately.

Accordingly, it is possible to form a moving magnetic field (not shown) by sequentially supplying currents with phase differences that change with time to the coil arrangement set 201 for phase A and the coil arrangement set 202 for phase B. Using such a moving electromagnetic field, it is possible to achieve the same effect as a stator of an electromagnetic machine. Meanwhile, although the phases of the coil arrangement 200 are illustrated as two phases in FIG. 2, but is not limited thereto, and a coil arrangement of three or more phases is also possible by adding sets as necessary and sequentially overlapping them alternately.

Figure 3:
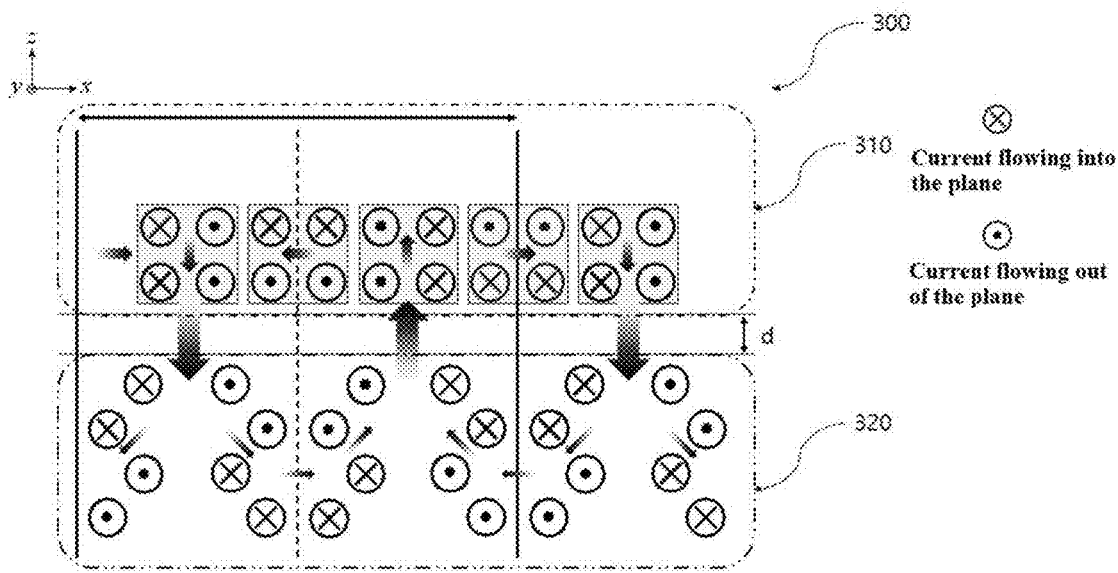
FIG. 3 is an exemplary cross-sectional view schematically illustrating current flow and magnetic flux magnitude according to a coil arrangement according to an embodiment of the present invention.

FIG. 3 is an exemplary cross-sectional view schematically illustrating current flow and magnetic flux magnitude according to a coil arrangement according to an embodiment of the present invention.

As illustrated in FIG. 3, the coil arrangement 300 according to the embodiment of the present invention comprises a first coil arrangement 310 and a second coil arrangement 320. In this case, the second coil arrangement 320 is the same as the coil arrangement illustrated in FIG. 1 and described above, but the first coil arrangement 310 can be arranged as a Halbach Array which is illustrated in FIG. 3 and is a special structure of the above-described coil arrangements. In addition, in the coil arrangement 300, magnetic flux is strengthened between the first coil arrangement 310 and the second coil arrangement 320, and the magnetic flux may be relatively small to a negligible extent or cancelled. Meanwhile, although the first coil arrangement 310 is illustrated as a Halbach Array in FIG. 3, but is not limited thereto, and the second coil arrangement 320 may be used as a Halbach Array, or both of the first coil arrangement 310 and the second coil arrangement 320 may be used as a Halbach Array as necessary.

Figure 4:
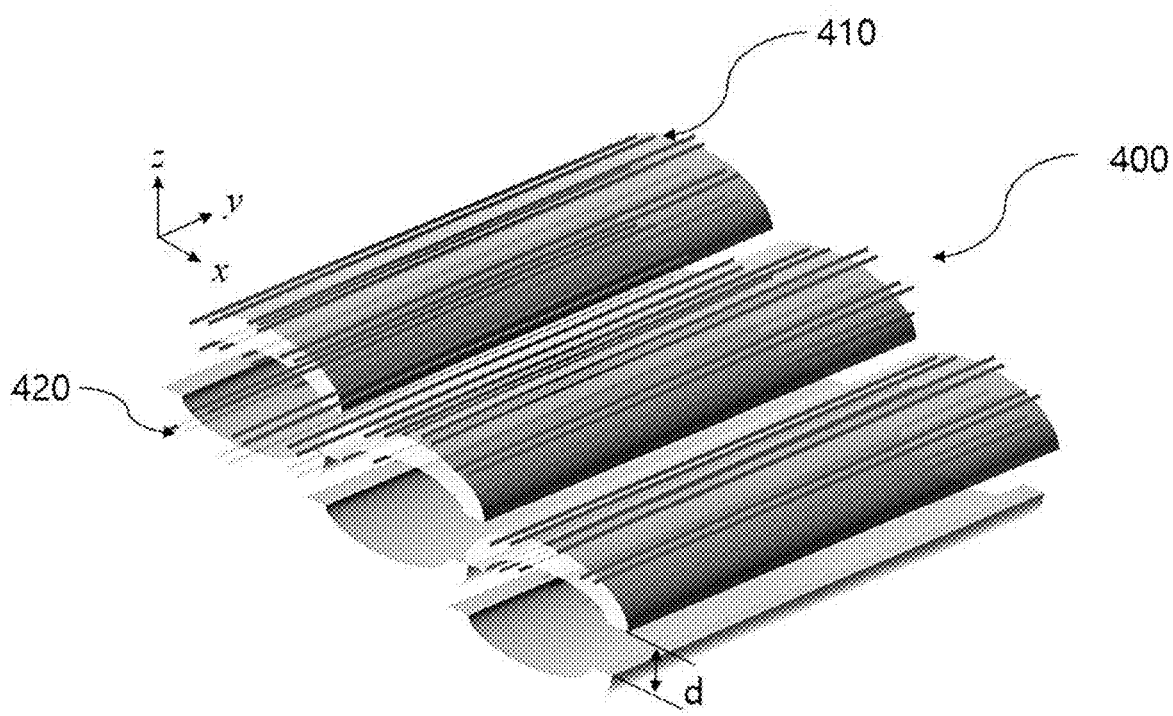
FIG. 4 is an exemplary schematic perspective view of a coil arrangement structure according to an embodiment of the present invention.

FIG. 4 is an exemplary schematic perspective view of a coil arrangement structure according to an embodiment of the present invention.

As illustrated in FIG. 4, in the coil arrangement 400 according to the embodiment of the present invention, the first coil arrangement 410 and the second coil arrangement 420 repeat the same structure at every spatial period along the x-axis direction. In addition, the first coil arrangement 410 and the second coil arrangement 420 are extended in length in the direction in which the current flows (that is, y-axis direction) in the periodic structure, and has a segmented toroid or segmented solenoid current distribution.

In addition, the moving field electromagnetic machine (not shown) comprising the coil arrangement 400 according to an embodiment of the present invention may be implemented with an iron core free structure or a minimum iron core. Therefore, it is expected that efficiency can be maximized by using the minimum iron core in the electromagnetic machine, weight and size can be minimized, and core loss due to the use of the iron core can be reduced.

In addition, the magnetic field generated by the coil arrangement according to the embodiment of the present invention is periodically changed in one direction. All these properties are possible only with the coil arrangement according to the embodiment of the present invention without using an iron core. In particular, the magnetic field $B_Z^{(A)}(x)$ generated by the coil arrangement according to the embodiment of the present invention can be approximated as a sine wave as follows.

$$B_Z^{(A)}(x) = B_0 \cos\frac{2\pi x}{\lambda_S} \qquad \text{(Equation 1)}$$

In here, $\lambda_S$ is the spatial period of the magnetic field. In the case of a moving field electromagnetic machine, $\lambda_S$ is the spatial period of the stationary coil (unit m), and the spatial period of the mover coil can be expressed as $\lambda_m$. It is one of the coil design elements of the stator of an electromagnetic machine. A stator coil can contain several periods of an electromagnetic machine. That is, the superscript (A) denotes coil (phase) A. The magnetic flux density is mostly strengthened in the z-axis direction.

Meanwhile, it is assumed that the other directional components of the magnetic flux density are negligible, and especially in the space between complementary coil arrangements, such as the coil arrangement of the embodiment of the present invention, the other directional components are negligible. The magnetic field of the stator can be expressed by the following equation which is proportional to the stator current.

$$B_0 = k_S I_S \qquad \text{(Equation 2)}$$

In addition, for coil (phase) B, a coil arrangement according to an embodiment of the present invention may produce different magnetic fluxes. Coil (phase) B is physically moved $\lambda_S/4$ more than coil (phase) A and the magnetic field $B_Z^{(B)}(x)$ of coil B can be expressed as the following equation.

$$B_Z^{(B)}(x) = B_0 \sin\frac{2\pi x}{\lambda_S}\lambda_S = B_0 \cos\left(k_S\left(x + \frac{\lambda_S}{4}\right)\right) \qquad \text{(Equation 3)}$$

In here, $k_S$ is the propagation vector of the first coil arrangement (stator), and $k_S = 2\lambda/\lambda_S$. The propagation vector of the second coil arrangement (mover) may be expressed as $k_m = 2\pi/\lambda_m$.

The analysis of the coil arrangement according to the embodiment of the present invention is exemplarily performed using a two-phase coil structure. Even assuming such a two-phase coil structure, the concept is the same, and the generality is not impaired. This analysis can be extended to a polyphase coil structure like a three-phase coil structure, and the analysis results and conclusions can be equally applied to a polyphase system. If necessary, differences between two-phase systems and three-phase systems can be mentioned. Meanwhile, in the case of a three-phase system, three sets of coils, generally called U, V and W coils, are required. V and W coils are shifted in spatial phase by $\lambda_S/3$ and $2\lambda_S/3$ compared to U coils.

In the coil arrangement according to the embodiment of the present invention, the magnetic field generated by the complementary first coil arrangement and the second coil arrangement has the following characteristics:

The magnetic field between the first coil arrangement and the second coil arrangement is strengthened in one side of the z-axis directions (i.e., between the coil arrangements). Except one side where the magnetic field is strengthened, it is almost cancelled out in the other side (i.e., outside the coil arrangement).

Meanwhile, magnetic fields generated in coil (phase) A and coil (phase) B of the coil arrangement according to the embodiment of the present invention are independently generated and overlapped. In addition, coil A and coil B are electrically driven with a phase difference of 90 degrees to generate a moving magnetic field. The overlappingly modulated magnetic field $B_Z(x)$ by coil A and coil B can be expressed as the following equation.

$$B_Z(x) = B_Z^{(A)}(x)\cos(2\pi f_S t) + B_Z^{(B)}(x)\sin(2\pi f_S t) \qquad \text{(Equation 4)}$$

Meanwhile, referring to Equations 1 and 3, Equation 4 can be expressed as the following Equation.

$$B_Z(x) = B_0(k_S x)\cos(\omega_S t) + B_0(k_S x)\sin(\omega_S t) = B_0 \cos(k_S x - \omega_S t) \qquad \text{(Equation 5)}$$

In here, $\omega_S$ is the period of the first coil arrangement current, and the relation with the frequency $f_S$ of the first coil arrangement current is $\omega_S = 2\pi f_S$.

The above magnetic flux density is in the form of a moving magnetic field in which the waveform pattern moves in the positive x-axis direction with the next velocity $v_S$.

$$v_S = \frac{\omega_S}{k_S} \qquad \text{(Equation 6)}$$

The direction of the wave pattern moving in the negative x-axis direction can be changed by changing the sign of the current in the coil pair or by time modulation.

An electromagnetic machine can be manufactured by providing a mover according to a coil in which current can flow perpendicular to a magnetic field generated by supplying current through a stator coil comprising a coil arrangement according to an embodiment of the present invention.

A moving field electromagnetic machine can be configured using the above coil arrangement. A moving electromagnetic machine according to an embodiment of the present invention comprises a stator and a mover, wherein the stator comprises a first coil arrangement; the first coil arrangement comprises at least one first half period and at least one second half period formed adjacent to each other, wherein the first half period comprises at least two coils having different current flowing directions; and the first half period and the second half period may have mirror images in adjacent directions. A detailed description of the coil arrangement comprised in the moving field electromagnetic machine according to an embodiment of the present invention corresponds to the detailed description of the coil arrangement according to the embodiment of the present invention described above, and thus, redundant description will be omitted.

Alternatively, the stator may further comprise a second coil arrangement formed to be spaced apart from the first coil arrangement by a predetermined distance and having a mirror image in a spaced apart direction, wherein the mover may be formed between the first coil arrangement and the second coil arrangement.

Alternatively, the mover may comprise a second coil arrangement formed to be spaced apart from the first coil arrangement by a predetermined distance and having a mirror image in the spaced apart direction. That is, the first coil arrangement and the second coil arrangement of the coil arrangement according to the embodiment of the present invention may be a stator or a mover, respectively.

In addition, the mover may be a rotor.

A wire in which current can flow in the positive y-axis direction is assumed, and assume that the mover is allowed to move in the x-axis direction. If the amount of current flowing through the wire is i, the Lorentz force $\delta F_x(x)$ can be expressed as the following equation for the length l of the wire (or l is the length of the region where the magnetic flux is constant).

$$\delta F_x(x) = l I_y(x) B_Z(x) \qquad \text{(Equation 7)}$$

In here, $I_y(x)$ is the current flowing in the y direction from the position x. As a function of x, we can form a wire arrangement through which current flows. In particular, the current distributed on the mover has the same (spatial) period as the stator.

$$I_y(x_m) = I_0 \cos\left\{\frac{2\pi x}{\lambda_S} - \omega_S t - \phi\right\} \qquad \text{(Equation 8)}$$

In here, $x_m$ is the x-direction coordinates of the second coil arrangement (mover), and the x-direction coordinate of the first coil arrangement (stator) may be expressed as $x_S$.

Thus, it means that a current on the mover can be generated to cause this current to move relative to the mover (or possibly a rotor). In principle, a sinusoidal distribution of current can be realized by stacking very small wire loops together, and the number of wires per unit length can be expressed as the following equation.

$$n(x_n) = n_0 \cos\left\{\frac{2\pi x_m}{\lambda_S}\right\} \qquad \text{(Equation 9)}$$

If a small current i flows through the wire, it can be expressed by the following equation.

$$I_0 = n_0 i \qquad \text{(Equation 10)}$$

To implement sinusoidal current density distribution may not be easy to implement $$I_y^A(x_m) = I_0 \sum_k \left\{ h(x_m - k\lambda_S) - h\left(x_m - k\lambda_S - \frac{\lambda_S}{2}\right)\right\} \qquad \text{(Equation 11)}$$

If $0 < x_m < \frac{\lambda_S}{4}$, $h(x_m) = 1$, and if $x_m > \frac{\lambda_S}{4}$, $h(x_m) = 0$.

In here, $h(x_m)$ is a periodic function with period $\lambda_S$. For example, $\phi$ is any initial phase value of the mover.

Figure 5:
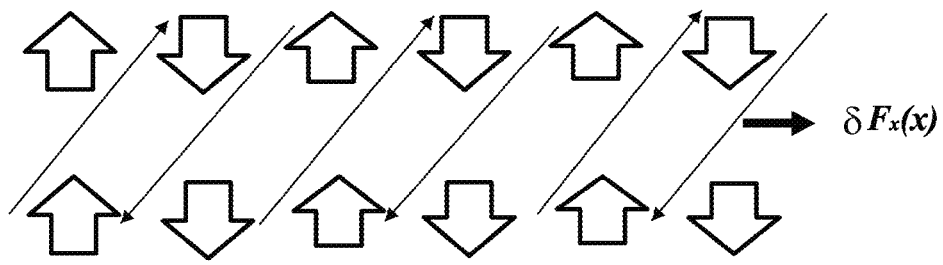
FIG. 5 is a conceptual diagram schematically illustrating an interaction between a magnetic field and a current generated by a coil arrangement structure according to an embodiment of the present invention.

FIG. 5 is a conceptual diagram schematically illustrating an interaction between a magnetic field and a current generated by a coil arrangement structure according to an embodiment of the present invention.

Referring to FIG. 5, the Lorentz force generated in the electric wire through which the current flows by the interaction between the magnetic field and the current generated by the coil arrangement according to the embodiment of the present invention may be expressed as the following equation in the x-axis direction. On the other hand, the force generated in the stator is the same in each half period along the x-axis direction, but is generated in the opposite direction.

$$\delta F_x(x) = l B_S I_m \cos\{k_S x_S - \omega_S t\} \cos\{k_S(x_S - v_m t) - \omega_m t - \phi\} \qquad \text{(Equation 12)}$$

It is assumed that $x_m$ is moving with velocity $v_m$ with respect to $x_S$. The relationship is as follows.

$$x_m = x_S - v_m t \qquad \text{(Equation 13)}$$

The force per period can be calculated as follows.

$$\delta F_x(x_S) = l B_S I_m \cos\{k_S x_S - \omega_S t\} \cos\{k_S(x_S - v_m t) - \omega_m t - \phi\}$$

$$\delta F_x(x_S) = l B_S I_m \cos\{k_S x_S - \omega_S t\} \cos\{k_S x_S - (\omega_m + k_S v_m) t - \phi\} \qquad \text{(Equation 14)}$$

Equation 14 can be rearranged as follows.

$$\delta F_x(x_S, t) = \tfrac{1}{2} l B_S I_m [\cos\{2 k_S x_S - (\omega_S + \omega_m + k_S v_m) t - \phi\} + \cos\{(\omega_S - \omega_m - k_S v_m) t - \phi\}] \qquad \text{(Equation 15)}$$

The first term in Equation 15 changes rapidly in both space and time. When the force is accumulated over many spatial periods regardless of time the average value disappears. The force per spatial period $\lambda_S$ (M is large enough and integrated over M periods) can be expressed as the following equation.

$$f_x(x_S, t) = \frac{1}{M} \int_0^{M\lambda_S} \delta F_x(x_S, t) = \frac{1}{2} n_m \lambda_S l B_0 I_m \cos\{(\omega_S - \omega_m - k_S v_m) t - \phi\} \qquad \text{(Equation 16)}$$

The periodic average force for any periodic current distribution can be calculated. The results appear to be the same as the harmonic components of the same Fourier series expansion are generated as a current average value of 0.

The relationship between the periods of the current driven in the mover is same as the following equation.

$$(\omega_m + k_S v_m) = \omega_S \qquad \text{(Equation 17)}$$

That is, the moving magnetic field generated in the mover means that the synthesized magnetic field is synchronized with the moving magnetic field generated by the stator. Since the spatial period of the mover and the stator has the same value, the magnetic poles of the mover and the stator are attracted to opposite sides, and thus the magnetic flux paths are synchronized and field locked.

When the mover and the stator are magnetically field locked to each other, the position of the mover (rotor) is in the equilibrium position, and the average magnetic force between the mover and the stator becomes zero in the equilibrium state. $\phi$ denotes the electric field phase difference and is proportional to the position offset from equilibrium between the mover and the stator.

$$f_{x,SYNC}(x, t) = \frac{1}{M} \int_0^{M\lambda_S} \delta F_x(x, t) = \frac{1}{2} n_m \lambda_S l B_0 I_0 \cos\phi \qquad \text{(Equation 18)}$$

If $\phi = 0$, the external force or torque does not change, and the magnetic flux field locking places the mover in the equilibrium position. When the mover moves in equilibrium, a magnetic force is generated and the mover moves to the equilibrium position. Conversely, when an external force or torque is applied to the mover, the magnetic force due to the pulling action of the opposite pole corresponds to the external force. At this time, the position of the mover is changed according to an external force. The magnitude of the reaction is proportional to the product of the stator current and the mover current, and the total magnetic force or torque is proportional to the number of spatial periods.

In here, if cos φ is positive and constant, a steady state force arises on the mover from the interaction of the stator and the mover (or rotor), and the force is pushing the mover against friction. In this case, the power supplying machines of the stator and mover supplies power for slow acceleration or steady state against friction. If φ=0, the maximum force is generated.

When the moving field electromagnetic machine according to an embodiment of the present invention is used as a motor, the following condition is maintained while current is supplied.

$$\cos\{(\omega_S-\omega_m+k_S v_m)t-\phi\}\geq 0 \quad \text{(Equation 19)}$$

The condition cos φ<0 is a steady state condition when the mover (rotor) is being pushed by an external force. A negative force means that work is performed by an external force. That is, when the moving field electromagnetic machine according to an embodiment of the present invention is operating as a generator. Electric current flows through the mover coil, so power is generated.

In the case of a steady state force, the mover moves with velocity $v_m$ and the current moves at the same velocity vs as the magnetic field produced by the stator. When the frequency of the mover and the stator is the same and there is no external force, the mover maintains a fixed position. However, if the mover and the stator are driven at different frequencies and the magnetic field moves in the same direction, the mover (rotor) axis moves in $v_S-v_m$. When the magnetic rotation (field rotation) is in the opposite direction, the mover (rotor) shaft rotation speed is the sum of the stator magnetic rotation speed and the mover (rotor) magnetic rotation speed. Through this, it is possible to enable fast rotation.

When the magnetic field in the stator moves with velocity vs, it can be expressed as the following equation.

$$v_S=\omega_S/k_S \quad \text{(Equation 20)}$$

When a steady-state force is generated in a mover, the mover (rotor) moves with a very slow acceleration or in the case when the force is balanced with an external force, at this time, it is moved at a constant velocity.

Figure 6:
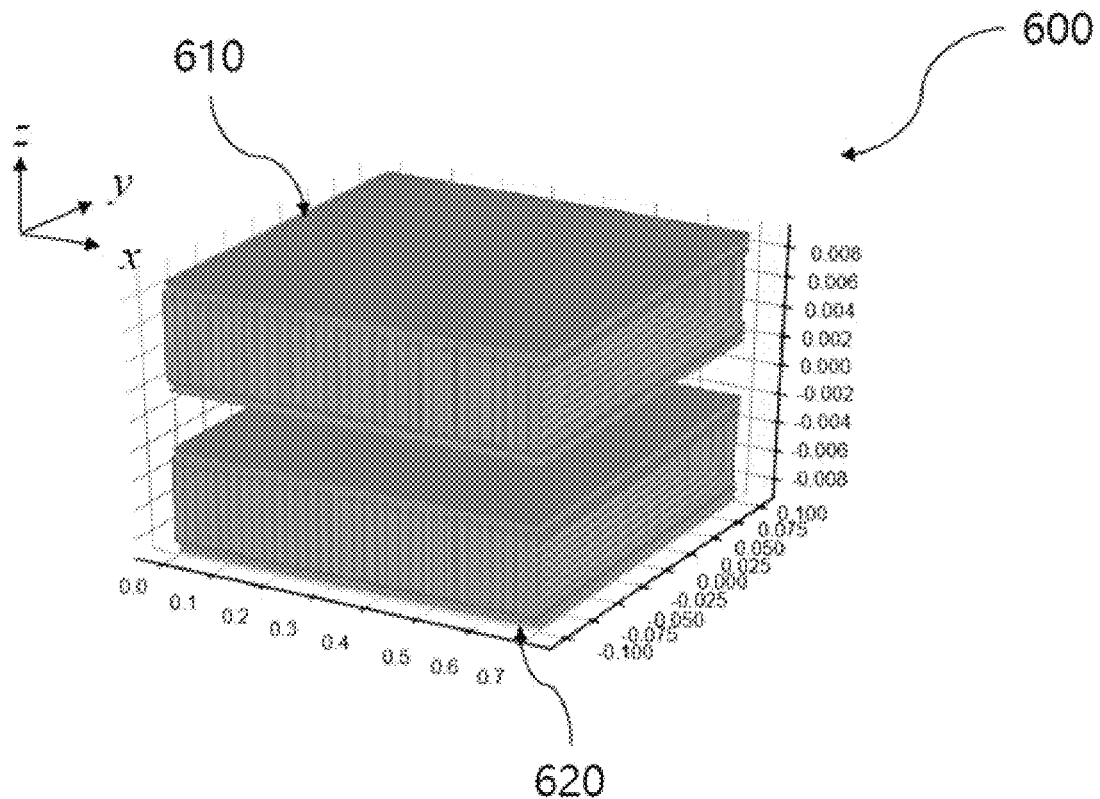
FIG. 6 is a schematic cross-sectional view illustrating a coil arrangement according to an embodiment of the present invention applied in a horizontal direction with a stacked coil.

FIG. 6 is a schematic cross-sectional view illustrating a coil arrangement according to an embodiment of the present invention applied in a horizontal direction with a stacked coil.

Referring to FIG. 6, a coil arrangement 600 according to an embodiment of the present invention has a stacked coil and is implemented as a periodic structure in the x-axis direction. In this case, the coil arrangement 600 is implemented as a first coil arrangement 610 and a second coil arrangement 620 spaced apart by a predetermined distance in the z-axis direction. In addition, the magnetic flux density is strengthened in one direction which is between the first coil arrangement 610 and the second coil arrangement 620, and magnetic flux densities are offset except in directions facing each other inside the first coil arrangement 610 and the second coil arrangement 620, and the magnetic field leakage can be minimized in the outside.

Figure 7:
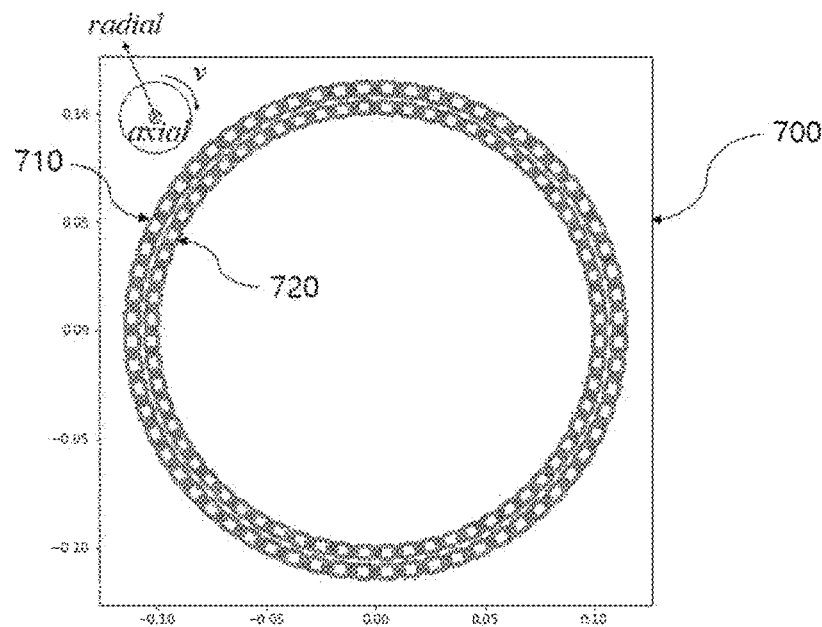
FIG. 7 is a schematic cross-sectional view illustrating a coil arrangement according to an embodiment of the present invention applied in a three-dimensional structure with a stacked coil.

FIG. 7 is a schematic cross-sectional view illustrating a coil arrangement according to an embodiment of the present invention applied in a three-dimensional structure with a stacked coil.

Referring to FIG. 7, a coil arrangement 700 according to an embodiment of the present invention is implemented in a circular shape with a stacked coil. At this time, the coil arrangement 700 according to an embodiment of the present invention is spaced apart by a predetermined distance in a radial direction, and the first coil arrangement 710 and the second coil arrangement 720 repeat the same structure at every spatial period along the tangential direction. In addition, the first coil arrangement 710 and the second coil arrangement 720 are implemented to be complementary to each other. That is, the current distribution of the first coil arrangement 710 can be viewed as having a mirror image of that of the second coil arrangement 720 with respect to the tangential direction. In addition, in the first coil arrangement 710 and the second coil arrangement 720 arranged in form of a circle, the magnetic flux density is strengthened to one side between them in the radial direction, but the magnetic flux density to the other side in the outside of them is canceled.

Meanwhile, in here, the first coil arrangement 710 and the second coil arrangement 720 are arranged on the circumference and are short in size and thus are exemplarily illustrated to have almost the same size, but is not limited thereto, and the size of the coil arrangement on the inner circumference can be reduced or the size of the coil arrangement on the outer circumference can be increased within the scope that does not impair the spirit of the present invention if necessary.

Figure 8:
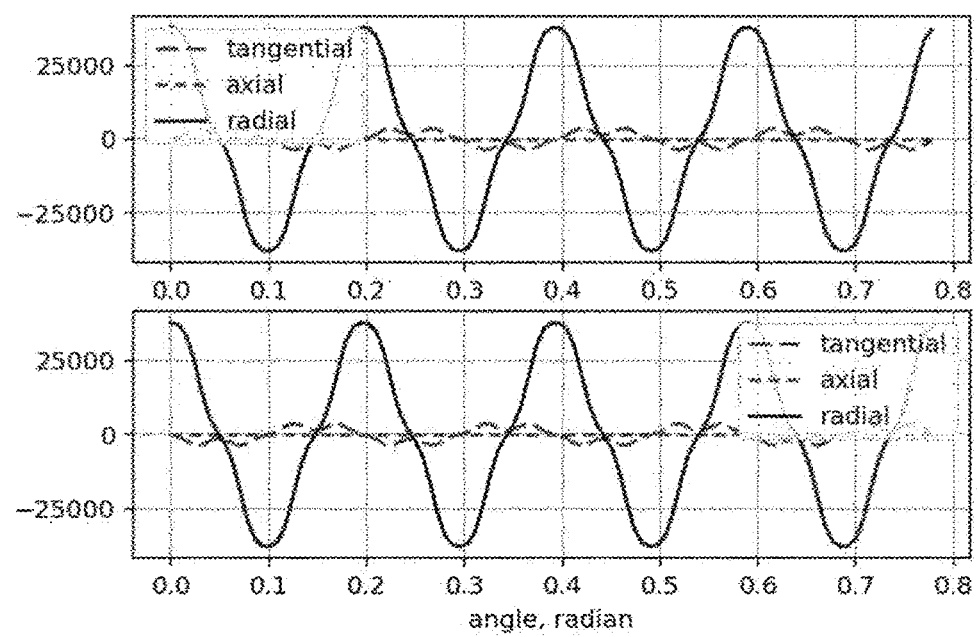
FIG. 8 is a simulation result diagram for a structure to which a three-dimensional structure is applied to a coil arrangement according to an embodiment of the present invention.

FIG. 8 is a simulation result diagram for a structure to which a three-dimensional structure is applied to a coil arrangement according to an embodiment of the present invention.

This simulation result diagram was calculated using the python program and based on the Biot-Savart law. Referring to FIG. 8, results obtained near the middle of the air gap for the first coil arrangement 710 and the second coil arrangement 720 of the coil arrangement 700 illustrated in FIG. 7 are shown. Accordingly, the magnetic flux is strengthened in the radial direction at the center of the air gap between the first coil arrangement 710 and the second coil arrangement 720, but the magnetic flux in the axial or tangential direction is relatively scarce.

Figure 9:
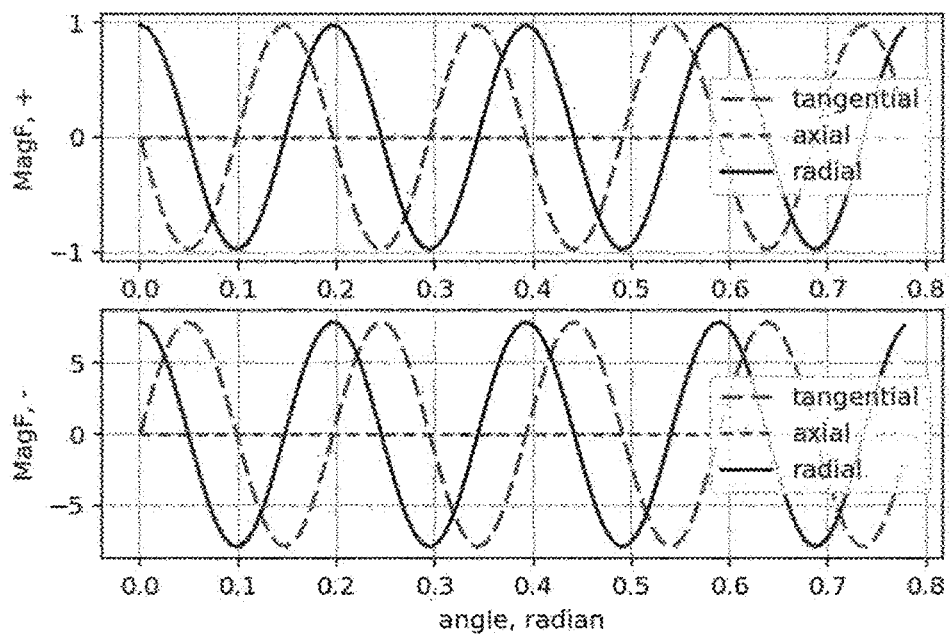
FIG. 9 is a simulation result diagram for a structure to which a three-dimensional structure of a coil arrangement according to an embodiment of the present invention is applied.

FIG. 9 is a simulation result diagram for a structure to which a three-dimensional structure of a coil arrangement according to an embodiment of the present invention is applied.

Referring to FIG. 9, results obtained from the first coil arrangement 710 and the second coil arrangement 720 of the coil arrangement 700 illustrated in FIG. 7 in the vicinity of the region of interest of half the size of the air gap are shown. Therefore, it is confirmed that there is almost no magnetic flux leakage in all directions. Meanwhile, the region of interest means the inside comprising the first coil arrangement 710 and the second coil arrangement 720.

Figure 10:
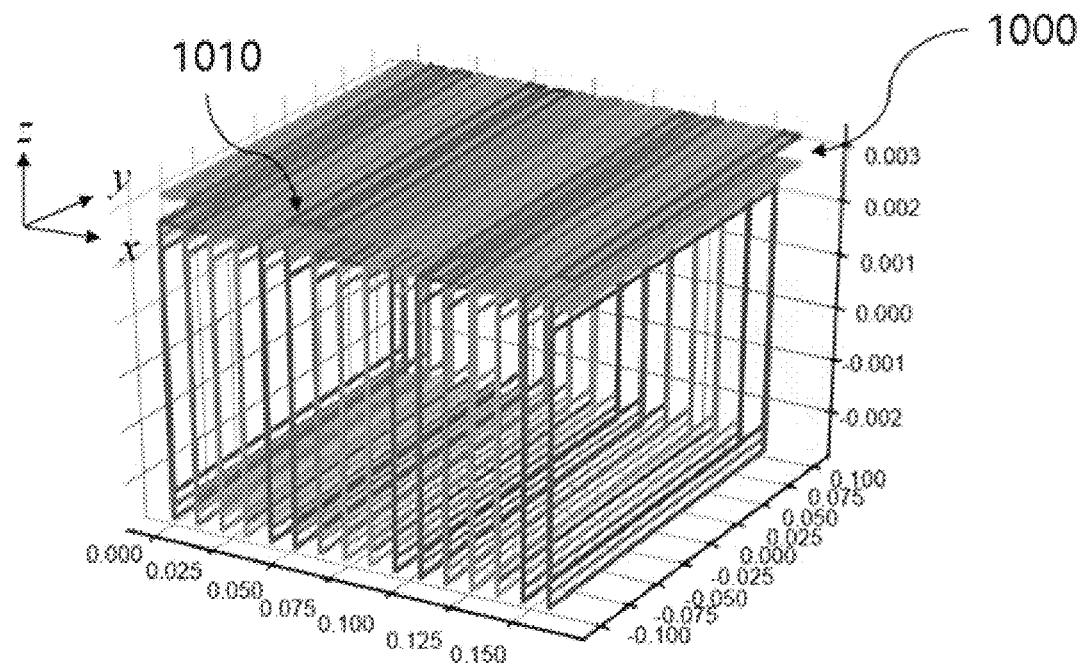
FIG. 10 is a schematic cross-sectional view illustrating a coil arrangement according to an embodiment of the present invention applied with a planar coil structure.

FIG. 10 is a schematic cross-sectional view illustrating a coil arrangement according to an embodiment of the present invention applied with a planar coil structure.

Referring to FIG. 10, a coil arrangement 1000 according to an embodiment of the present invention implements a planar coil structure periodically in the x-axis and z-axis directions. At this time, in the coil arrangement 1000, the magnetic field is strengthened in the + direction of the z axis, and the magnetic field is relatively weakened in the − direction.

Figure 11:
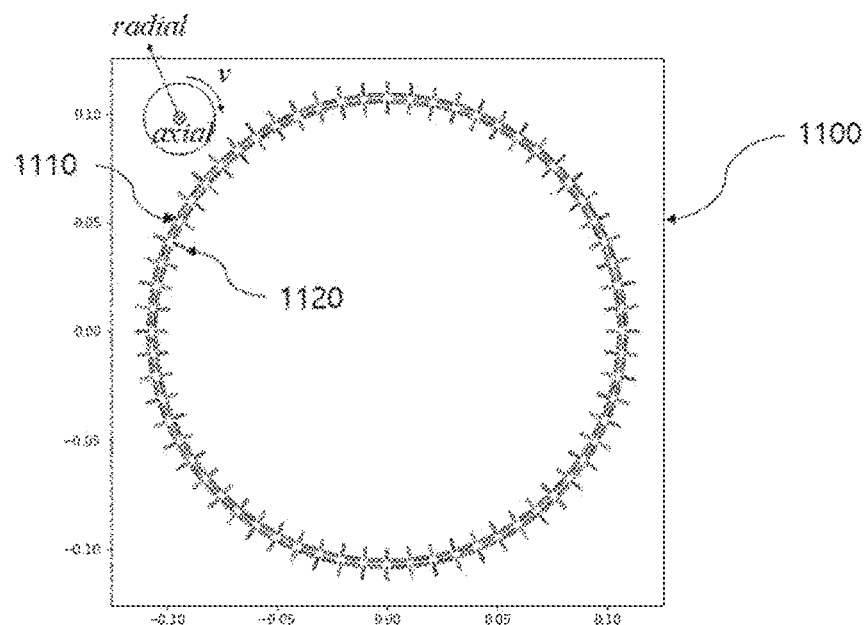
FIG. 11 is a schematic cross-sectional view illustrating a coil arrangement according to an embodiment of the present invention applied in a three-dimensional structure having a planar coil structure.

FIG. 11 is a schematic cross-sectional view illustrating a coil arrangement according to an embodiment of the present invention applied in a three-dimensional structure having a planar coil structure.

Referring to FIG. 11, a coil arrangement 1100 according to an embodiment of the present invention has a flat coil structure and is implemented in a circular shape. At this time, the coil arrangement 1100 according to the embodiment of the present invention is spaced apart by a predetermined distance in the radial direction, are implemented by a first coil arrangement 1110 and a second coil arrangement 1120 that are complementary to each other.

Figure 12:
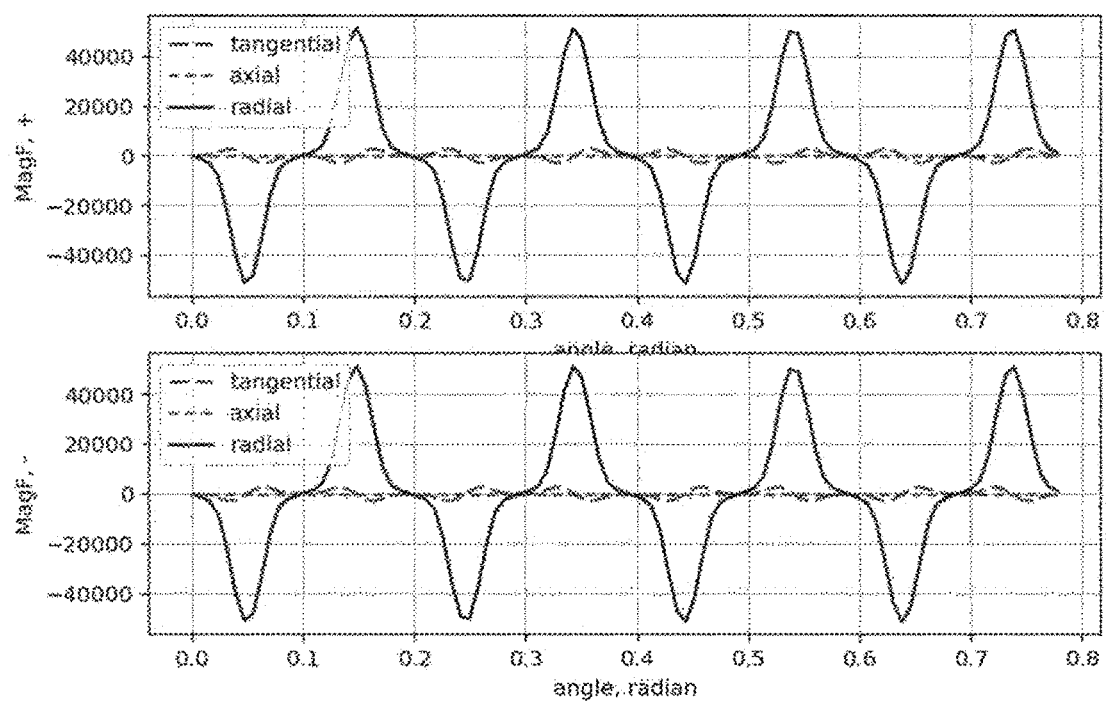
FIG. 12 is a simulation result diagram for a structure in which a coil arrangement according to an embodiment of the present invention is three-dimensionally applied with a planar coil structure.

FIG. 12 is a simulation result diagram for a structure in which a coil arrangement according to an embodiment of the present invention is three-dimensionally applied with a planar coil structure. Referring to FIG. 12, a strong magnetic field is shown in a radial direction near the center of the air gap in the region of interest, and the magnetic field is canceled to a degree that can be neglected in the axial direction or the tangential direction. Although not shown, as the results of FIG. 9, it was confirmed that there is almost no magnetic field leakage outside the region of interest.

A moving field electromagnetic machine using a coil arrangement according to an embodiment of the present invention strengthens a magnetic field on one side within a region of interest and almost eliminates a magnetic field leakage outside the region of interest. In addition, the moving field electromagnetic machine according to an embodiment of the present invention can minimize its size and weight, reduce core loss, and overcome performance limitations by not using or using a minimum iron core.

What is claimed is:

1. A coil arrangement comprising:
   a first coil arrangement and
   a second coil arrangement formed to be spaced apart at a predetermined interval and having a mirror image in a spaced apart direction, and
   wherein the first coil arrangement comprises at least one first half period and at least one second half period formed adjacent to each other,
   wherein the at least one first half period comprises at least two coils having anti-parallel current flowing directions,
   wherein the at least one first half period and the at least one second half period have mirror image with respect to an interface between them wherein a direction of a magnetic field formed between the first half of the first coil arrangement and a first half of the second coil arrangement corresponding to the first half of the first coil arrangement is formed in a first direction facing each other,
   wherein a direction of a magnetic field formed between the second half of the first coil arrangement and a second half of the second coil arrangement corresponding to the second half of the first coil arrangement is formed in a second direction facing each other, and
   wherein the first direction and the second direction are opposite to each other.

2. The coil arrangement according to claim 1, wherein a direction of a magnetic field formed between the two coils forming the at least one first half period and a direction of a magnetic field formed between two coils forming the at least one second half period are opposite to each other.

3. The coil arrangement according to claim 1, wherein the at least one first half period comprises: a first layer adjacent to the second coil arrangement and comprising a first layer coil structure comprising at least two coils having different current flowing directions a second layer disposed on an upper portion of the first layer and comprising a second layer coil structure having a same current flowing direction as the first layer coil structure of the first layer but located more outwardly than the first layer coil structure; and a third layer disposed on an upper portion of the second layer and comprising a third layer coil structure having a current flowing direction opposite to the second layer coil structure but located more inwardly than the second layer coil structure.

4. The coil arrangement according to claim 3, further comprising:
   a fourth layer disposed on an upper portion of the third layer and comprising a fourth layer coil structure having a same current flowing direction as the third layer coil structure but located more outwardly than the third layer coil structure.

5. The coil arrangement according to claim 1, wherein the at least one first half period comprises: a lower layer adjacent to the second coil arrangement and comprising a lower layer coil structure comprising at least two coils having different current flowing direction from each other; and an upper layer disposed on an upper portion of the lower layer and comprising an upper layer coil structure having a current flowing direction opposite to the lower layer coil structure.

6. The coil arrangement according to claim 1, wherein the first coil arrangement comprises: a plurality of first half periods; and a plurality of second half periods, wherein the at least one first half periods and the at least one second half periods are periodically formed in adjacent directions.

7. The coil arrangement according to claim 1, wherein the first coil arrangement or the second coil arrangement has a length being extended according to the current flowing directions, and comprises a segmented toroid current distribution or a segmented solenoid current distribution.

8. The coil arrangement according to claim 1, wherein the coil arrangement is formed of at least two sets, and currents flowing in the coils constituting the respective sets have the same phase or different phases.

9. The coil arrangement according to claim 8, wherein a moving magnetic field is formed by having a phase difference between the currents flowing in the coils constituting the respective sets.

10. A moving field electromagnetic machine comprising: a stator; and a mover, wherein the stator comprises a first coil arrangement, wherein the first coil arrangement comprises at least one first half period and at least one second half period formed adjacent to each other, wherein the at least one first half period comprises at least two coils having anti-parallel current flowing directions, wherein the at least one first half period and the at least one second half period have mirror image with respect to an interface between them.

11. The moving field electromagnetic machine according to claim 10, wherein the stator further comprises:
   a second coil arrangement formed to be spaced apart from the first coil arrangement by a predetermined interval and having a minor image in the spaced apart direction.

12. The moving field electromagnetic machine according to claim 11, wherein the mover is disposed between the first coil arrangement and the second coil arrangement.

13. The moving field electromagnetic machine according to claim 11, wherein the first coil arrangement and the second coil arrangement are formed of at least two sets, and currents flowing in the coils constituting the respective sets have different phases so as a moving magnetic field to be formed.

14. The moving field electromagnetic machine according to claim 10, wherein the mover comprises a first coil arrangement formed to be spaced apart from the first coil arrangement by a predetermined distance (aka airgap) and having a mirror image in the spaced apart direction.

15. The moving field electromagnetic machine according to claim 10, wherein a direction of a magnetic field formed between the two coils forming the at least one first half period and a direction of a magnetic field formed between two coils forming the at least one second half period are opposite to each other.

16. The moving field electromagnetic machine according to claim 10, wherein the at least one first half period comprises: a first layer adjacent to the second coil arrangement and comprising a first layer coil structure comprising at least two coils having different current flowing directions; a second layer disposed on an upper portion of the first layer and comprising a second layer coil structure having a same current flowing direction as the first layer coil structure of the first layer but located more outwardly than the first layer coil structure; and a third layer disposed on an upper portion of the second layer and comprising a third layer coil structure having a current flowing direction opposite to the second layer coil structure but located more inwardly than the second layer coil structure.

17. The moving field electromagnetic machine according to claim 11, wherein the at least one first half period comprises: a lower layer adjacent to the second coil arrangement and comprising a lower layer coil structure comprising at least two coils having different current flowing direction from each other; and an upper layer disposed on an upper portion of the lower layer and comprising an upper layer coil structure having a current flowing direction opposite to the lower layer coil structure.

18. The moving field electromagnetic machine according to claim 10, wherein the first coil arrangement comprises:
 a plurality of first half periods; and
 a plurality of second half periods,
 wherein the first half periods and the second half periods are periodically formed in adjacent directions.

19. The moving field electromagnetic machine according to claim 10, wherein the first coil arrangement has a length being extended according to the current flowing directions, and comprises a segmented toroid current distribution or a segmented solenoid current distribution.

20. The moving field electromagnetic machine according to claim 10, wherein the mover is a rotor.

* * * * *